United States Patent [19]

Slack et al.

[11] Patent Number: 5,648,445
[45] Date of Patent: Jul. 15, 1997

[54] LIQUID 1,3-PHENYLENE DIISOCYANATE, 1, 1'-BIPHENYL DIISOCYANATE AND 1,1'-OXY-BIS-(ISOCYANATO-BENZENE)

[75] Inventors: William E. Slack, Moundsville; Rick L. Adkins, New Martinsville, both of W. Va.

[73] Assignee: Bayer Corporation, Pittsburgh, Pa.

[21] Appl. No.: 577,999

[22] Filed: Dec. 22, 1995

[51] Int. Cl.$^6$ .................................................. C08G 18/30
[52] U.S. Cl. ........................... 528/49; 252/182.2; 560/37; 560/25; 560/301; 560/330; 560/345
[58] Field of Search ................ 252/182.2; 560/27, 560/25, 301, 330, 345; 528/49

[56] References Cited

U.S. PATENT DOCUMENTS

| | | | |
|---|---|---|---|
| 3,644,457 | 2/1972 | König et al. | 260/453 SP |
| 4,160,080 | 7/1979 | Köenig et al. | 528/59 |
| 4,738,991 | 4/1988 | Narayan | 521/124 |
| 4,866,103 | 9/1989 | Cassidy et al. | 521/159 |
| 5,319,053 | 6/1994 | Slack et al. | 528/48 |
| 5,319,054 | 6/1994 | Slack et al. | 528/48 |

FOREIGN PATENT DOCUMENTS

| | | |
|---|---|---|
| 71-99176 | 9/1973 | Japan . |
| 994890 | 12/1965 | United Kingdom . |

*Primary Examiner*—Rachel Gorr
*Attorney, Agent, or Firm*—Joseph C. Gil; Lyndanne M. Whalen

[57] ABSTRACT

Allophanate-modified 1,3-phenylene diisocyanates or 1,1-biphenyl diisocyanates or 1,1'-oxy-bis-(isocyanato benzenes) which are storage stable liquid at 25° C. are made by reacting the diisocyanate and a mono-alcohol to form an isocyanate containing urethane groups. The urethane groups in the diisocyanate are then converted to allophanate groups. The resultant product which has an isocyanate group content of from about 10 to about 40% may be further reacted with isocyanate-reactive compounds to produce an allophanate-modified diisocyanate prepolymer containing urethane or urea groups having an isocyanate group content of from about 5 to about 40.0%. The liquid, storage-stable, allophanate-modified diisocyanates produced by these processes are particularly useful in the production of elastomers and flexible foams.

19 Claims, No Drawings

LIQUID 1,3-PHENYLENE DIISOCYANATE, 1,1'-BIPHENYL DIISOCYANATE AND 1,1'-OXY-BIS-(ISOCYANATO-BENZENE)

BACKGROUND OF THE INVENTION

The present invention relates to liquid 1,3-phenylene diisocyanate (PDI), 1,1'-biphenyl diisocyanate (BPDI) and 1,1'-oxy-bis-(isocyanato-benzene)(OIB). More specifically, the present invention relates to liquid allophanate-modified prepolymers of PDI, BPDI and OIB and processes for their production and use.

Liquid methylene diphenyl diisocyanates are generally known in the art. U.S. Pat. No. 3,644,457, for example, discloses room temperature, stable, liquid isocyanates prepared by reacting one mole of diphenylmethane diisocyanate with 0.1 to 0.3 mols of poly-1,2-propylene ether glycol.

U.S. Pat. No. 4,738,991 discloses organic polyisocyanates characterized by allophanate linkages which are prepared by reacting an organic polyisocyanate with a poly- or mono-hydric alcohol in the presence of an organo-metallic catalyst. The catalyst is then deactivated with a compound such as an inorganic acid, organic acid, organic chloroformate or an organic acid chloride.

U.S. Pat. No. 4,866,103 discloses a polyisocyanate composition useful for producing elastomers in a RIM process. The disclosed polyisocyanate composition is the reaction product of (a) an alcohol and/or thiol having an average functionality of from about 1.5 to about 4 and an average equivalent weight of at least 500 with (b) at least 2 equivalents per hydroxyl and/or thiol equivalent of an organic polyisocyanate under conditions such that at least about 20% of the initially formed urethane and/or thiourethane groups are converted to allophanate and/or thioallophanate groups.

Other prior art relating to the preparation of allophanates which contain isocyanate groups includes British Patent 994,890 which teaches the reaction of urethane group containing isocyanates with excess diisocyanate either by heating the isocyanate alone or in the presence of a catalyst (e.g., a metal carboxylate, a metal chelate or a tertiary amine). This heating is continued until the isocyanate content is reduced to theoretical (i.e., the level at which theoretically complete reaction of the urethane groups is achieved).

U.S. Pat. No. 4,160,080 discloses a process for producing allophanate containing aliphatically and/or cycloaliphatically bound isocyanate groups in which compounds containing urethane groups are reacted with polyisocyanates having aliphatic and/or cycloaliphatic isocyanate groups in the presence of a strong acid. The process is generally conducted at a temperature of from 90° C. to 140° C. for about 4 to 20 hours.

Japanese Patent Application No. 1971-99176 discloses a method for preparing liquid diphenylmethane diisocyanate in which diphenylmethane diisocyanate is reacted with an aliphatic monovalent alcohol.

U.S. Pat. No. 5,319,053 discloses liquid diphenylmethane diisocyanate prepolymers having an NCO content of from 12 to 32.5% which are the reaction products of an aliphatic alcohol and diphenylmethane diisocyanate.

U.S. Pat. No. 5,319,054 discloses a process for the production of liquid methylene diphenyl diisocyanate in which one equivalent of a diisocyanate and one equivalent of an aliphatic alcohol are reacted to form a diurethane. This diurethane is then reacted with an isomeric mixture of diphenylmethane diisocyanate in an amount sufficient to generate an allophanate having an isocyanate group content of from about 12.0 to about 30.0%.

The prior art does not, however, disclose a process for producing a storage stable, liquid 1,3-phenylene diisocyanate, or 1,1'-biphenyl diisocyanate or 1,1'-oxy-bis-(isocyanato benzene).

SUMMARY OF THE INVENTION

It is an object of the present invention to provide a storage stable, liquid 1,3-phenylene diisocyanate, 1,1'-biphenyl diisocyanate and 1,1'-oxy-bis-(isocyanato benzene).

It is also an object of the present invention to provide a process for the production of a storage stable, liquid 1,3-phenylene diisocyanate, 1,1'-biphenyl diisocyanate and 1,1'-oxy-bis-(isocyanato benzene).

It is a further object of the present invention to provide liquid, allophanate-modified prepolymers of 1,3-phenylene diisocyanate, 1,1'-biphenyl diisocyanate and 1,1'-oxy-bis-(isocyanato benzene).

It is another object of the present invention to provide a process for the production of liquid, allophanate-modified prepolymers of 1,3-phenylene diisocyanate, 1,1'-biphenyl diisocyanate and 1,1'-oxy-bis-(isocyanato benzene).

It is also an object of the present invention to provide a process for the production of elastomers and flexible foams in which the storage stable, liquid 1,3-phenylene diisocyanate, or 1,1'-biphenyl diisocyanate, or 1,1'-oxy-bis-(isocyanato benzene) prepolymers of the present invention are used as a starting material.

These and other objects which will be apparent to those skilled in the art are accomplished by reacting 1,3-phenylene diisocyanate or 1,1'-biphenyl diisocyanate or 1,1'-oxy-bis-(isocyanato benzene) with either an aliphatic mono-alcohol having from 1 to about 18 carbon atoms or an aromatic mono-alcohol having from 6 to about 18 carbon atoms to form a urethane. The urethane is then converted to the storage stable, liquid allophanate group containing 1,3-phenylene diisocyanate or 1,1'-biphenyl diisocyanate or 1,1'-oxy-bis-(isocyanato benzene). The allophanate-modified PDI, BPDI or OIB may then be reacted with (a) an organic material containing two or more hydroxy, primary amine or secondary amino groups or any combination thereof having a molecular weight of from 400 to 6000, or (b) a diol having a molecular weight of from 60 to 200 or a combination of (a) and (b) to produce a liquid prepolymer.

The allophanate-modified 1,3-phenylene diisocyanate, 1,1'-biphenyl diisocyanate and 1,1'-oxy-bis-(isocyanato benzene) prepolymers of the present invention are stable and liquid at 25° C. As used herein, the term "stable" means that the NCO content does not change by more than one percent and the viscosity of the prepolymer does not change by more than ten percent when stored at 25° C. for 3 months. As used herein, the term "liquid" means that the modified isocyanate does not precipitate solids when stored at 25° C. for 3 months.

DETAILED DESCRIPTION OF THE INVENTION

The present invention relates to storage stable, liquid allophanate-modified 1,3-phenylene diisocyanates having NCO group contents of from about 10 to about 45% (preferably from about 20 to about 35%) by weight and to a process for the production of these modified 1,3-phenylene diisocyanates.

The present invention also relates to storage stable, liquid allophanate-modified 1,1'-biphenyl diisocyanate and 1,1'-oxy-bis-(isocyanato benzene) having NCO group contents of from about 12 to about 27% (preferably from about 17 to about 25%) by weight and to a process for the production of these allophanate-modified isocyanates.

The present invention also relates to prepolymers having an NCO group content of from about 5 to about 40% (preferably from about 15 to about 32%) by weight which prepolymers are made from the storage stable, liquid allophanate-modified 1,3-phenylene diisocyanates and to a process for the production of these prepolymers.

The present invention is also directed to prepolymers having an NCO group content of from about 5 to about 26% (preferably from about 12 to about 23%) by weight which prepolymers are made from storage stable, liquid allophanate-modified 1,1'-biphenyl diisocyanates or 1,1'-oxy-bis-(isocyanato benzenes) and to a process for the production of these prepolymers.

The allophanate-modified 1,3-phenylene diisocyanate or 1,1'-biphenyl diisocyanate or 1,1'-oxy-bis-(isocyanato benzene) is produced by reacting 1,3-phenylene diisocyanate or 1,1'-biphenyl diisocyanate or 1,1'-oxy-bis-(isocyanato benzene) with an aliphatic or aromatic mono-alcohol, optionally in the presence of a catalyst known to promote the formation of allophanate groups. The urethane groups produced are then converted to allophanate groups. The isocyanate and mono-alcohol are reacted in amounts such that desired NCO content will be obtained.

1,3-phenylene diisocyanate and processes for its production are known to those skilled in the art.

1,1'-biphenyl diisocyanates and 1,1'-oxy-bis-(isocyanato benzene) and processes for their production are also known to those skilled in the art. These isocyanates may be isomeric mixtures in which from about 30 to about 100% by weight is the 4,4'-isomer, from 0 to about 35% by weight is the 2,2'-isomer and from 0 to about 35% by weight is the 2,4'-isomer.

Aliphatic alcohols which may be used to produce the storage stable, liquid isocyanates of the present invention include any of the mono-alcohols (i.e., alcohols having only one hydroxyl group) having from 1 to about 18, preferably from about 1 to about 6, most preferably about 4 carbon atoms. These alcohols preferably have a molecular weight of from about 32 to about 400. Suitable aliphatic alcohols include: cycloaliphatic alcohols, aliphatic alcohols containing aromatic groups, and aliphatic alcohols containing groups which do not react with isocyanates (e.g., ether groups and halogens such as bromine and chlorine). Specific examples of suitable aliphatic alcohols include: 1-butanol, cetyl alcohol, 2-methoxy-ethanol and 2-bromoethanol.

Aromatic alcohols are alcohols which have a hydroxyl group attached directly to the aromatic ring. Aromatic alcohols which may be reacted with 1,3-phenylene diisocyanate in accordance with the present invention include those aromatic alcohols having one hydroxyl group and from 6 to about 18, preferably from about 6 to about 12 carbon atoms. These alcohols preferably have molecular weights of from about 94 to about 400. Specific examples of suitable aromatic alcohols include: phenol, m-cresol and 1-naphthol.

The reaction of 1,3-phenylene diisocyanate or 1,1'-biphenyl diisocyanate or 1,1'-oxy-bis-(isocyanato benzene) with the mono-alcohol may be carried out in the presence of a solvent. If used, the solvent is generally inert with respect to the isocyanate. Specific examples of suitable solvents include: toluene, tetrahydrofuran, and o-dichloro-benzene.

The allophanate-forming reaction is usually conducted in the presence of a catalyst. Useful catalysts include those which can be neutralized or otherwise stopped before they catalyze subsequent, unwanted reactions. For example, a catalyst such as zinc acetylacetonate may be used to promote allophanate formation in the practice of the present invention. An acidic material such as anhydrous hydrochloric acid, sulfuric acid, benzoyl chloride, bis(2-ethylhexyl) phosphate or any Lewis acid may be added in an amount such that 2 equivalents of the acid are present for each equivalent of the zinc acetylacetonate present in order to stop the reaction. Other allophanate-promoting catalysts which may be used in the practice of the present invention include: zinc 2-ethylhexanoate, cobalt 2-ethylhexanoate, cobalt naphthanate, lead linoresinate and stannous octoate. Zinc acetylacetonate is the preferred catalyst. Benzoyl chloride and bis(2-ethylhexyl) phosphate are preferred catalyst inactivators.

In a preferred embodiment of the process of the invention, the allophanate may be prepared by reacting the isocyanate with an aliphatic or aromatic mono-alcohol at a temperature of from about 25° C. to about 120° C., preferably from about 40° to about 80° C. The urethane is converted to an allophanate modified isocyanate at temperatures of from about 60° to about 120° C., preferably from about 85° to about 105° C. Zinc acetylacetonate is preferably used as the catalyst and benzoyl chloride is used as the catalyst inactivator in amounts such that the equivalent ratio of benzoyl chloride to zinc acetyl acetonate is from about 1:1 to about 1:2.

In another embodiment of the present invention, the storage stable, liquid, allophanate-modified isocyanate may be produced by reacting the isocyanate with a mono-alcohol in the presence of an allophanate-promoting catalyst. In this embodiment, the reaction mixture is first heated to a temperature of up to about 90° C., preferably from about 50° to about 60° C. so that urethane groups are formed. The temperature of the reaction mixture is then increased to a temperature of from about 60° to about 120° C., preferably from about 85° to about 105° C. so that allophanate formation takes place.

After the allophanate-formation has been completed or the allophanate-forming reaction has been stopped, any catalyst remaining in the reaction mixture must be neutralized before the product liquid isocyanate is used to produce a prepolymer.

The storage stable, liquid, allophanate-modified isocyanate prepolymers of the present invention are made by reacting the corresponding allophanate-modified diisocyanate prepared as described above with a high and/or a low molecular weight isocyanate-reactive organic material containing two or more (preferably 2 to 3) active hydrogen groups such as hydroxyl groups or primary or secondary amino groups or combinations thereof.

Suitable high molecular weight isocyanate-reactive organic materials include those having molecular weights (number average) of from about 400 to about 6000 and preferably from about 2000 to about 5000. Suitable low molecular weight isocyanate-reactive organic materials generally have molecular weights in the range from about 60 to 200, preferably from about 76 to about 90.

The allophanate-modified diisocyanate prepolymers containing urethane, urea, or biuret groups of the present invention may be formed by reacting the selected allophanate-modified diisocyanate with the organic isocyanate-reactive compound in accordance with any of the techniques known to those skilled in the art.

In one suitable method, a mixture of the allophanate-modified diisocyanate and an organic isocyanate-reactive compound is heated to a temperature of from about 40° to about 150° C., preferably from about 50° to about 100° C. to form a prepolymer containing urethane or urea groups. Heating the mixture of allophanate-modified diisocyanate and isocyanate-reactive compound to a temperature of from about 100° to about 150° C., preferably from about 110° to about 120° C. results in the formation of a prepolymer having biuret groups.

Suitable organic materials containing two or more hydroxyl groups and having molecular weights (number average) of from about 400 to about 6000 include polyols such as polyester polyols, polyether polyols, polyhydroxy polycarbonates, polyhydroxy polyacetals, polyhydroxy polyacrylates, polyhydroxy polyester amides and polyhydroxy polythioethers. Polyester polyols, polyether polyols and polyhydroxy polycarbonates are preferred.

Suitable polyester polyols include the reaction products of polyhydric alcohols (preferably dihydric alcohols to which trihydric alcohols may be added) and polybasic (preferably dibasic) carboxylic acids. In addition to these polycarboxylic acids, corresponding carboxylic acid anhydrides or polycarboxylic acid esters of lower alcohols or mixtures thereof may also be used to prepare the polyester polyols useful in the practice of the present invention. The polycarboxylic acids may be aliphatic, cycloaliphatic, aromatic and/or heterocyclic and they may be substituted, e.g. by halogen atoms, and/or unsaturated. Examples of suitable polycarboxylic acids include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include: ethylene glycol; 1,2- and 1,3-propylene glycol; 1,3- and 1,4-butylene glycol; 1,6-hexanediol; 1,8-octanediol; neopentyl glycol; cyclohexanedimethanol; (1,4-bis (hydroxymethyl)cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethylolpropane. The polyesters may also contain a portion of carboxyl end groups. Polyesters of lactones, e.g. -caprolactone or hydroxyl carboxylic acids such as ω-hydroxycaproic acid, may also be used.

Suitable polycarbonates containing hydroxyl groups include those obtained by reacting diols with phosgene, a diarylcarbonate (e.g., diphenyl carbonate) or cyclic carbonates (e.g., ethylene or propylene carbonate). Examples of suitable diols include: 1,3-propanediol; 1,4-butanediol; 1,6-hexanediol; diethylene glycol; triethylene glycol; and tetraethylene glycol. Polyester carbonates obtained by reacting polyesters or polylactones (such as those described above) with phosgene, diaryl carbonates or cyclic carbonates may also be used in the practice of the present invention.

Polyether polyols which are suitable for producing the prepolymers of the present invention include those obtained in known manner by reacting one or more starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Polyethers which do not contain more than about 10% by weight of ethylene oxide units are preferred. Polyethers obtained without the addition of ethylene oxide are most preferred. Suitable starting compounds containing reactive hydrogen atoms include polyhydric alcohols (described above as being suitable for preparing polyester polyols); water; methanol; ethanol; 1,2,6-hexane triol; 1,2,4-butane triol; trimethylol ethane; pentaerythritol; mannitol; sorbitol; methyl glycoside; sucrose; phenol; isononyl phenol; resorcinol; hydroquinone; and 1,1,1- or 1,1,2-tris-(hydroxylphenyl)-ethane.

Polyethers modified by vinyl polymers are also suitable for producing prepolymers in accordance with the process of the present invention. Such modified polyethers may be obtained, for example, by polymerizing styrene and acrylonitrile in the presence of a polyether (U.S. Pat. Nos. 3,383,351; 3,304,273; 3,523,095; 3,110,695 and German Patent No. 1,152,536).

The polythioethers useful in the production of the prepolymers of the present invention include the condensation products obtained from thiodiglycol on its own and/or with other glycols, dicarboxylic acids, formaldehyde, aminocarboxylic acids or amino alcohols. These condensation products may be polythio-mixed ethers, polythioether esters or polythioether ester amides, depending on the co-components.

Amine-terminated polyethers useful in preparing the prepolymers of the present invention may be prepared by reacting a primary amine with a polyether containing terminal leaving groups such as halides, or mesylates as disclosed in commonly assigned U.S. patent application Ser. No. 07/957,929, filed on Oct. 7, 1992, or as disclosed in U.S. Pat. Nos. 3,666,726, 3,691,112 and 5,066,824.

Suitable polyacetals include those prepared from aldehydes (e.g., formaldehyde) and glycols such as diethylene glycol, triethylene glycol, ethoxylated 4,4'-dihydroxydiphenyldimethylmethane, and 1,6-hexanediol. Polyacetals prepared by the polymerization of cyclic acetals may also be used in the practice of the present invention.

Polyhydroxy polyester amides and polyamines useful in the production of the prepolymers of the present invention include the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

The low molecular weight, isocyanate-reactive compounds useful in producing the prepolymers of the present invention have from about 2 to about 4 hydroxyl groups, preferably about two hydroxyl groups, and have an average molecular weight of from about 60 to about 200, preferably from about 76 to about 90. These low molecular weight, isocyanate-reactive compounds may be used in combination with or instead of the high molecular weight material containing two or more hydroxyl groups. Useful low molecular weight isocyanate-reactive materials include the polyhydric alcohols which have previously been described in the process for the preparation of the polyester polyols and polyether polyols. Dihydric alcohols are preferred. The weight ratio of the low molecular weight to the high molecular weight material containing two or more hydroxyl groups is generally from about 0.001 to about 2, preferably from about 0.01 to about 0.40.

In addition to the above-mentioned isocyanate-reactive compounds, monofunctional and even small amounts of trifunctional and higher functional compounds generally known in polyurethane chemistry may be used to produce the prepolymers of the present invention. For example, trimethylol-propane may be used in special cases in which slight branching is desired.

In the process of the invention, the hydroxyl functional material(s) may be reacted with the allophanate-modified diisocyanate over the temperature range of from about 40° to about 150° C., preferably from about 50° to about 90° C., over a period of time sufficient to complete the reaction. Catalysts and solvents may be used to aid the reaction. Examples of catalysts useful for promoting urethane reactions include di-n-butyl tin dichloride, di-n-butyl tin diacetate, di-n-butyl tin dilaurate, triethylenediamine, and bismuth nitrate.

Examples of the useful solvents include: toluene, tetrahydrofuran, and chlorobenzene.

The allophanate-modified 1,3-phenylene diisocyanates of the present invention generally have an isocyanate group content of from about 10 to about 45%, preferably from about 20 to about 35%. The allophanate-modified, urethane or urea group containing isocyanate prepolymers of the present invention which are based on 1,3-phenylene diisocyanate generally have an isocyanate group content of from about 5 to about 40%, preferably from about 15 to about 32%.

The allophanate-modified 1,1'-biphenyl diisocyanate and 1,1'-oxy-bis-(isocyanato benzenes) of the present invention generally have an isocyanate group content of from about 12 to about 27%, preferably from about 17 to about 25%. The allophanate-modified, urethane or urea group containing isocyanate prepolymers of the present invention which are based on 1,1'-biphenyl diisocyanate or 1,1'-oxy-bis-(isocyanato benzene) generally have an isocyanate group content of from about 5 to about 26%, preferably from about 12 to about 23%.

The liquid allophanate-modified diisocyanates of the present invention and their prepolymers are particularly useful in the production of isocyanate reaction products such as polyurethanes.

Having thus described our invention, the following Examples are given as being illustrative thereof. All parts and percentages given in these Examples are by parts by weight or percentages by weight, unless otherwise specified.

EXAMPLES

The following materials were used in these Examples:

POLYOL A: A propylene glycol/propylene oxide adduct having a functionality of 2 and a molecular weight of 2000.

POLYOL B: A glycerine/propylene oxide/ethylene oxide adduct in which 17% by weight of the terminal groups were ethylene oxide having a functionality of 3 and a molecular weight of 4500.

POLYOL C: A polytetrahydrofuran ether diol having a molecular weight of 2,000.

PG: Propylene glycol.

1,3-B: 1,3-butanediol.

m-PDI: 1,3-phenylene diisocyanate.

Example 1

100 parts of m-PDI were charged to a stirred reactor and heated to 60° C. 15.7 parts of 1-butanol were then added to the reactor. The contents of the reactor were then heated to 60° C. and maintained at that temperature for 25 minutes. 0.012 part of zinc acetylacetonate was then added to the reaction mixture. The contents of the reactor were stirred while being heated to 90° C. After 30 minutes at 90° C., the NCO content was 30.0%. The reaction mixture was cooled to about 25° C. and then 0.025 part of benzoyl chloride was added. The product obtained was a clear liquid having an NCO content of 30.0% which was storage stable at 25° C.

Examples 2–5

The procedure of Example 1 was repeated using 100 parts by weight 1,3-phenylene diisocyanate, 1-butanol (in the amount indicated in Table 1), 0.01% by weight (based on the total weight of m-PDI and 1-butanol) zinc acetylacetonate and 0.02% by weight (based on the total weight of m-PDI and 1-butanol) benzoyl chloride. The product obtained in each of these Examples was a clear liquid that was storage stable at 25° C. The % NCO for each of these allophanate-modified m-PDI products is reported in TABLE 1.

TABLE 1

| Example | 1-butanol (pbw) | % NCO in Allophanate |
| --- | --- | --- |
| 2 | 11.8 | 34.9 |
| 3 | 15.9 | 29.7 |
| 4 | 12.5 | 33.8 |
| 5 | 22.2 | 22.2 |

Example 6

91.55 parts m-PDI were charged to a stirred reactor and heated to 60° C. 8.45 parts 1-butanol were added to the heated m-PDI and the reaction mixture was maintained at 60° C. for 15 minutes. 0.01 part zinc acetylacetonate was then added. The reaction mixture was stirred while being heated to 90° C. After 30 minutes at 90° C., the NCO content of the m-PDI was 38.4%. The reaction mixture was then cooled to 60° C. and 0.02 part benzoyl chloride was added. After 10 minutes at 60° C., 46.1 parts of POLYOL A were added. The reaction mixture was maintained at 60° C. for an additional 90 minutes and then cooled to 25° C. The product was a clear storage stable (at 25° C.) liquid which had an NCO content of 24.9%.

Example 7

The procedure of Example 6 was repeated using the same materials in the same amounts with the exception that 4.38 parts 1,3-B were added at the same time that the 46.1 parts POLYOL A were added. The resultant product was a clear liquid with an NCO content of 21.6% which was storage stable at 25° C.

Example 8

100 parts m-PDI were charged to a reactor. The stirred m-PDI was heated to 60° C. 15.9 parts of 1-butanol were added to the reactor. The contents of the reactor were maintained at 60° C. for 25 minutes. 0.01% by weight (based on the total weight of m-PDI and 1-butanol) zinc acetylacetonate was then added to the reaction mixture. The reaction mixture was stirred while being heated to 90° C. After 30 minutes, the reaction mixture was cooled to 60° C. and 0.02% by weight (based on the total weight of m-PDI and 1-butanol) benzoyl chloride was added. After the reaction mixture had been maintained at 60° C. for 10 minutes, 18.7 parts POLYOL A were added and the reaction mixture was maintained at 60° C. for an additional 90 minutes. The reaction mixture was then cooled to 25° C. The product was a clear liquid which had an NCO content of 24.9%. This product was storage stable at 25° C.

Example 9

The procedure of Example 8 was repeated using the same materials in the same amounts with the exception that 4.03 parts 1,3-B were added at the same time that the 18.7 parts of POLYOL A were added. The product was a clear liquid which had an NCO content of 21.4%. This product was storage stable at 25° C.

Example 10

100 parts of m-PDI were charged to a reactor equipped with a stirrer and heated with stirring to 60° C. 12.5 parts 1-butanol were added to the reactor and the contents of the reactor were maintained at 60° C. for 25 minutes. 0.01% by weight (based on the total weight of m-PDI and 1-butanol) zinc acetylacetonate was then added and the contents of the reactor were heated while being stirred to 90° C. After 30 minutes at 90° C., the reaction mixture was cooled to 60° C. 0.02% by weight (based on the total weight of m-PDI and 1-butanol) of benzoyl chloride was then added to the mixture. After the reaction mixture had been maintained at 60° C. for 10 minutes, 12.5 parts POLYOL A were added. The contents of the reactor were then maintained at 60° C. for an additional 90 minutes and cooled to 25° C. The product was a clear liquid which had an NCO content of 29.9%. This product was storage stable at 25° C.

Example 11

The procedure of Example 10 was repeated using the same materials in the same amounts with the exception that 3.75 parts 1,3-B were added to the reaction mixture at the same time that the 12.5 parts POLYOL A were added. The product was a clear liquid which had an NCO content of 26.3%. This product was storage stable at 25° C.

Example 12

100 parts m-PDI were charged to a reactor equipped with a stirrer and heated to 60° C. with stirring. 11.8 parts 1-butanol were added to the reactor and the contents of the reactor were maintained at 60° C. with stirring for 25 minutes. 0.01% by weight (based on the total weight of m-PDI and 1-butanol) zinc acetylacetonate were then added to the reactor and the contents of the reactor were heated with stirring to 90° C. The contents of the reactor were maintained at 90° C. for 25 minutes and then cooled to 60° C. 0.02% by weight (based on the total weight of m-PDI and 1-butanol) benzoyl chloride was added and the contents of the reactor were maintained at 60° C. for 10 minutes before 3.35 parts 1,3-B were added. The reaction mixture was then maintained at 60° C. for 45 minutes before being cooled to 25° C. The product was a clear liquid which had an NCO content of 31.2%. This product was storage stable at 25° C.

Example 13

The procedure of Example 12 was repeated using the same materials in the same amounts with the exception that 3.35 parts propylene glycol instead of 1,3-B were used. The product was a clear liquid which had an NCO content of 30.8%. This product was storage stable at 25° C.

Example 14

The procedure of Example 8 was repeated using the same materials in the same amounts with the exception that 18.7 parts POLYOL C were used instead of POLYOL A. The product was a clear liquid which had an NCO content of 24.9%. This product was storage stable at 25° C.

Example 15

The procedure of Example 8 was repeated using the same materials in the same amounts with the exception that 3.22 parts PG were used instead of the 18.7 parts POLYOL A. The product was a clear liquid which had an NCO content of 25.9%. This product was storage stable at 25° C.

Example 16

The procedure of Example 8 was repeated using the same materials in the same amounts with the exception that 3.29 parts 1,3-B were used instead of the 18.7 parts POLYOL A. The product was a clear liquid which had an NCO content of 26.3%. This product was storage stable at 25° C.

Example 17

91.55 parts m-PDI were charged to a reactor equipped with a stirrer and heated with stirring to 60° C. 8.45 parts 1-butanol were added to the reactor and contents of the reactor were then maintained at 60° C. for 15 minutes. 0.01 part zinc acetylacetonate was then added to the reactor and the contents of the reactor were subsequently heated with stirring to 90° C. After 30 minutes at 90° C., the reaction mixture had an NCO content of 38.4%. The reaction mixture was then cooled to 60° C. and 0.02 part benzoyl chloride was added. The contents of the reactor were maintained at 60° C. for 10 minutes and then 2.5 parts 1,3-B and 72.7 parts POLYOL B were added to the reactor. The reactor contents were maintained at 60° C. for an additional 90 minutes and then cooled to 25° C. The product was a clear liquid which had an NCO content of 19.5%. This product was storage stable at 25° C.

Example 18

75 grams of an isomeric mixture of 1,1'-biphenyl diisocyanate were added to a 250 ml three-necked flask and heated to 100° C. This isomeric mixture was composed of 24.9% by weight of the 2,2'-isomer, 8.4% by weight of the 2,4'-isomer and 26.7% by weight of the 4,4'-isomer. 0.019 grams of zinc acetylacetonate were added to the heated diisocyanate. After 5 minutes, 6 grams of 1-butanol were added to the flask. The solution heated up to 126° C. before being cooled to 100° C. The temperature of the flask contents was maintained at 100° C. for 1 hour. 0.02 grams of additional zinc acetylacetonate were then added. The resultant allophanate-modified isocyanate had an NCO content of 27.5%. After 2.5 hours, 0.04 grams of additional zinc acetylacetonate were added to the flask and the contents of the flask were heated at 100° C. for an additional 30 minutes. 0.02 grams of benzoyl chloride were then added. A deep amber liquid which had an NCO content of 23.6% and a viscosity of 5840 mPa.s at 25° C. was recovered as the product.

Example 19

75 grams of 1,1'-oxy-bis-(4-isocyanato benzene) (NCO content=33.5%) were added to a 250 ml flask and heated to 75° C. 6 grams of 1-butanol were added and the contents of the flask were heated at 90° C. for 1.5 hours. The resultant urethane-modified isocyanate had an NCO content of 26.9%. 0.02 grams of zinc acetylacetonate were added to the flask and the contents of the flask were heated at 90° C. for 2 hours. No change in the % NCO was observed after this heating. 0.05 gram of additional zinc acetylacetonate was added to the flask and the contents of the flask were heated again at 90° C. for 2 hours. 0.3 grams of benzoyl chloride were then added to the contents of the flask. An amber, slightly turbid liquid product having an NCO content of 22.1% and a viscosity of 1887 mPa.s at 25° C. was obtained.

Example 20 (Comparative)

Example 5 was repeated with the exception that 1,4-phenylene diisocyanate was used instead of 1,3-phenylene diisocyanate. The NCO content of the allophanate-modified diisocyanate produced was 26.9%. The diisocyanate solidified when allowed to cool to 25° C.

Although the invention has been described in detail in the foregoing for the purpose of illustration, it is to be understood that such detail is solely for that purpose and that variations constituting other embodiments can be made therein by those skilled in the art without departing from the spirit and scope of the invention except as it may be limited by the claims.

What is claimed is:

1. A process for the production of a liquid, allophanate-modified diisocyanate having an isocyanate group content of from about 10 to about 45% which is a storage stable liquid at 25° C. comprising
   (a) reacting
      1) 1,3-phenylene diisocyanate or 1,1'-biphenyl diisocyanate or 1,1'-oxy-bis-(isocyanto benzene) with
      2) a mono-alcohol
   to form a urethane and
   (b) converting urethane groups in the product of (a) to allophanate groups.

2. The process of claim 1 in which the mono-alcohol is an aliphatic alcohol containing from 1 to about 18 carbon atoms or an aromatic alcohol containing from 6 to about 18 carbon atoms.

3. The process of claim 1 in which the urethane groups are converted to allophanate groups by heating the product of (a) to a temperature of from about 90° to about 120° C. in the presence of a zinc acetylacetonate catalyst.

4. The process of claim 3 in which benzoyl chloride is used to deactivate the zinc acetylacetonate catalyst.

5. The process of claim 4 in which the weight ratio of benzoyl chloride to zinc acetylacetonate is about 2:1.

6. The process of claim 1 in which a catalyst that promotes formation of allophanate groups is present during step (a).

7. The process of claim 6 in which step (a) is carried out at a temperature up to about 90° C. and step (b) is carried out at a temperature of from 90° to about 120° C.

8. The process of claim 1 which further comprises (c) reacting the product of step (b) with (i) an organic material containing two or more hydroxy, primary amine or secondary amino groups or any combination of such materials having a molecular weight (number average) of from 400 to 6000, (ii) a diol having a molecular weight of from 60 to 200 or a combination of (i) and (ii) to produce a liquid prepolymer having an isocyanate group content of from about 5 to 40% by weight.

9. The process of claim 1 in which the mono-alcohol contains ether groups.

10. The process of claim 9 in which the mono-alcohol has a molecular weight of from about 76 to about 400.

11. The process of claim 1 in which the mono-alcohol has a molecular weight of from about 76 to about 400.

12. The process of claim 1 in which step (a) is carried out at a temperature of from about 25° to about 125° C.

13. The process of claim 1 in which (a) 1) is 1,3-phenylene diisocyanate.

14. The process of claim 1 in which (a) 1) is 1,1'-biphenyl diisocyanate.

15. The process of claim 1 in which (a) 1) is 1,1'-oxy-bis-(isocyanato benzene).

16. An allophanate-modified 1,3-phenylene diisocyanate which is stable and liquid at 25° C. and has an isocyanate content of from about 20 to 35% which is prepared by the process of claim 1.

17. An allophanate-modified 1,1'-biphenyl diisocyanate which is stable and liquid at 25° C. and has an isocyanate content of from about 17 to about 25% which is prepared by the process of claim 1.

18. An allophanate-modified 1,1'-oxy-bis-(isocyanato benzene) which is stable and liquid at 25° C. and has an isocyanate content of from about 17 to about 25% which is prepared by the process of claim 1.

19. An allophanate-modified diisocyanate prepolymer which is stable and liquid at 25° C. and has an isocyanate content of about 5 to about 40% which is prepared by the process of claim 8.

* * * * *